United States Patent
Kume et al.

(10) Patent No.: US 7,898,595 B2
(45) Date of Patent: Mar. 1, 2011

(54) FRAME CONVERSION METHOD, FRAME CONVERSION CIRCUIT, AND ELECTRONIC CAMERA

(75) Inventors: Tsutomu Kume, Ibaraki (JP); Shinya Ishii, Kanagawa (JP); Tokuichiro Yamada, Kanagawa (JP); Yoshinori Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1374 days.

(21) Appl. No.: 10/542,639

(22) PCT Filed: Dec. 19, 2003

(86) PCT No.: PCT/JP03/16342

§ 371 (c)(1),
(2), (4) Date: Mar. 27, 2006

(87) PCT Pub. No.: WO2004/066625

PCT Pub. Date: Aug. 5, 2004

(65) Prior Publication Data

US 2006/0256236 A1    Nov. 16, 2006

(30) Foreign Application Priority Data

Jan. 21, 2003  (JP) .............................. 2003-012499

(51) Int. Cl.
   *H04N 7/01*   (2006.01)
   *H04N 11/20*  (2006.01)
(52) U.S. Cl. ........................ 348/443; 348/454; 348/459
(58) Field of Classification Search ................ 348/443, 348/454, 459, 441, 714, 716, 718, 305, 231.99, 348/222.1, 333.01, 65, 74, 75
See application file for complete search history.

(56) References Cited

U.S. PATENT DOCUMENTS 4,609,941 A  *  9/1986  Carr et al. ............... 375/240.12
4,891,701 A  *  1/1990  Shikina et al. ............... 348/451

(Continued)

FOREIGN PATENT DOCUMENTS

JP        59-188288        10/1984

(Continued)

*Primary Examiner*—Victor Kostak
(74) *Attorney, Agent, or Firm*—Frommer Lawrence & Haug LLP; William S. Frommer

(57) ABSTRACT

A method for converting frames that can display smooth moving images is provided. A memory (16) to which image data of frames in the NTSC format is written is provided. A memory controller (14) for retrieving image data of an odd field and an even field from the memory (16) every odd field period and even field period in the frame period of the PAL format is provided. An interpolating circuit (76) is provided. The interpolating circuit (76) mixes the image data of the odd field retrieved by the memory controller (14) and image data of a next odd field at a predetermined ratio to output as image data of an odd field in the frame period of the PAL format, and mixes the retrieved image data of the even field and image data of a next even field at a predetermined ratio to output as image data of an even field in the frame period of the PAL format. A coefficient-generating circuit (73) for changing the mixing ratios in the interpolating circuit (76) every field period of the PAL format is provided.

8 Claims, 9 Drawing Sheets

U.S. PATENT DOCUMENTS

| | | | | |
|---|---|---|---|---|
| 5,166,792 A | * | 11/1992 | Lyon | 348/441 |
| 5,274,447 A | * | 12/1993 | Nakagaki et al. | 348/443 |
| 5,351,088 A | * | 9/1994 | Nio et al. | 348/441 |
| 5,521,636 A | * | 5/1996 | Nakayama et al. | 348/222.1 |
| 5,598,218 A | * | 1/1997 | Inoue | 348/443 |
| 6,067,124 A | * | 5/2000 | Shirahama et al. | 348/581 |
| 6,144,412 A | * | 11/2000 | Hirano et al. | 348/441 |
| 6,411,341 B1 | * | 6/2002 | De Haan et al. | 348/714 |
| 6,933,963 B2 | * | 8/2005 | Abe et al. | 348/65 |
| 7,671,913 B2 | * | 3/2010 | Kume et al. | 348/305 |

FOREIGN PATENT DOCUMENTS

| | | |
|---|---|---|
| JP | 4-78284 | 3/1992 |
| JP | 4-151994 | 5/1992 |
| JP | 8 172609 | 7/1996 |
| JP | 11 215441 | 8/1999 |
| JP | 11-289521 | 10/1999 |

* cited by examiner

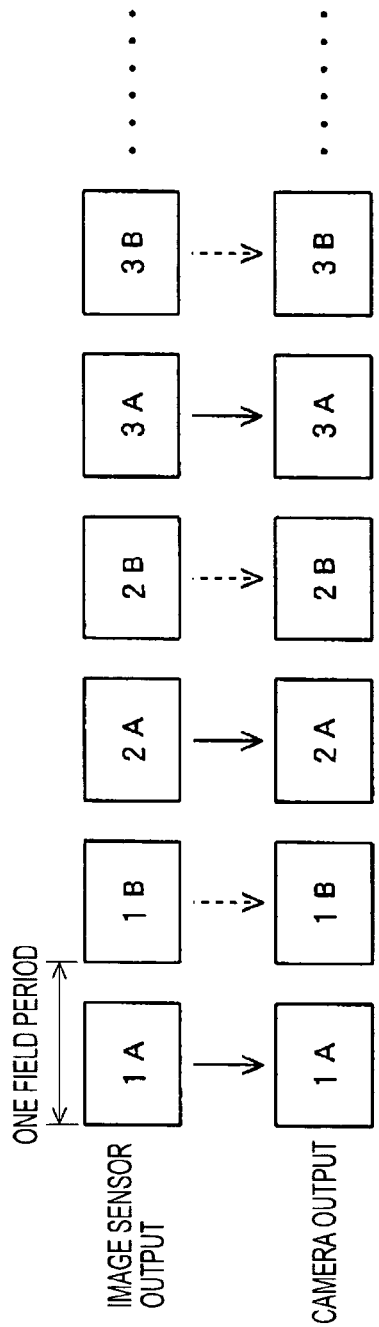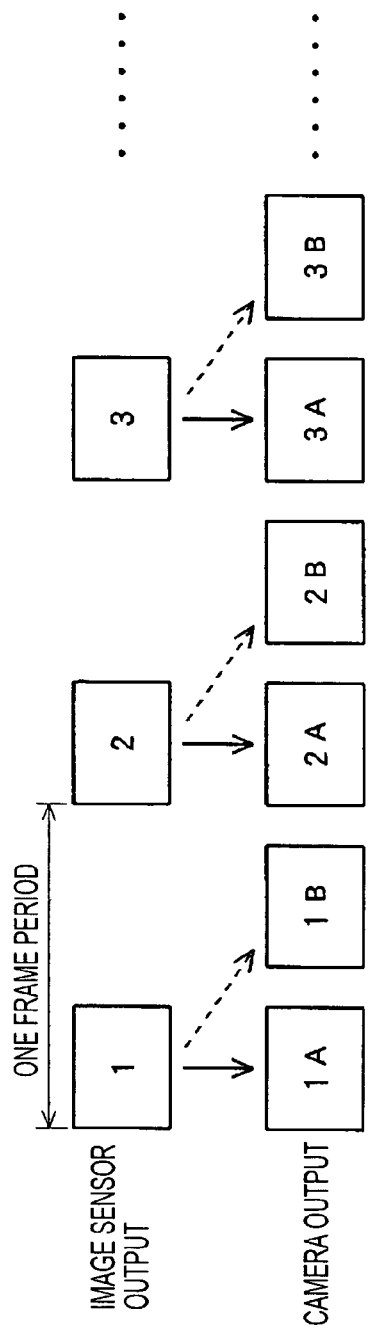
FIG. 6A
FIG. 6B

|  | NTSC | PAL |
|---|---|---|
| NUMBER OF HORIZONTAL SCANNING LINES | 525 LINES | 625 LINES |
| NUMBER OF EFFECTIVE SCANNING LINES | ABOUT 480 LINES | ABOUT 576 LINES |
| HORIZONTAL FREQUENCY fh | 4.5MHz/286 ≒ 15.734 kHz | 4.5MHz/288 = 15.625 kHz |
| FRAME FREQUENCY | fh/525 ≒ 29.97Hz | fh/625 = 25Hz |
| FIELD FREQUENCY | 2fh/525 ≒ 59.94Hz | 2fh/625 = 50Hz |

FRAME FREQUENCY OF NTSC FORMAT : FRAME FREQUENCY OF PAL FORMAT $$= \frac{4.5\text{MHz}}{286} \div 525 : \frac{4.5\text{MHz}}{288} \div 625$$

$$= 1200 : 1001$$

$$\fallingdotseq 6 : 5$$

FIG. 7

FRAME CONVERSION METHOD, FRAME CONVERSION CIRCUIT, AND ELECTRONIC CAMERA

TECHNICAL FIELD

The present invention relates to electronic cameras that capture and play back moving images, and in particular, relates to methods for converting frames in the National Television System Committee (NTSC) format into those in the Phase Alternation by Line (PAL) format.

BACKGROUND ART

Many digital still cameras include LCD viewfinders for checking images to be captured and captured images. In addition, many digital still cameras include video output terminals and can display images on, for example, external television receivers.

One type of digital still camera can capture moving images in addition to still images. In most cases, these digital still cameras capture moving images in the video graphics array (VGA) size, i.e., 640 dots in width and 480 dots in height, in the NTSC format in consideration of viewing on personal computers (see Japanese Unexamined Patent Application Publication Nos. 5-122663, 8-172609, and 2001-313896, for example).

In a video camera, i.e., a television camera, a charge coupled device (CCD) image sensor captures an image and outputs image data once every field period, as shown in the upper part of FIG. 6A. The image data is then processed and output from the camera as video signals, as shown in the lower part of FIG. 6A.

In FIGS. 6A and 6B, numerals 1, 2, 3, . . . are serial numbers assigned to respective certain consecutive frames or fields. A suffix A added to a field number indicates that the field is an odd field, and a suffix B indicates that the field is an even field. A solid arrow indicates image data of an odd field, and a dotted arrow indicates image data of an even field. Hereinafter, the same rules are followed in other drawings.

On the other hand, a digital still camera mainly captures still images and is suitably designed for capturing still images. Thus, in a digital still camera, a CCD image sensor captures an image and outputs image data once every frame period, as shown in the upper part of FIG. 6B. The image data of one frame is split into a first image data component of the odd field, as indicated by a solid arrow, and a second image data component of the even field, as indicated by a dotted arrow. These image data components are output from the camera as video signals, as shown in the lower part of FIG. 6B.

The above capturing and outputting techniques are also used for capturing moving images. Thus, when a digital still camera captures moving images, the motion of the images is jerky because the interval of capturing images in a digital still camera is twice that in a video camera.

FIG. 7 shows synchronizing frequencies of the NTSC format and the PAL format and the frequency ratio. Thus, when moving images are captured (or are captured and recorded) in the NTSC format, frames of image data in the NTSC format need to be converted into those in the PAL format for viewing on a PAL television receiver.

FIGS. 8 and 9 illustrate typical techniques for converting frames. The upper parts of FIGS. 8 and 9 show image data before frame conversion. This image data corresponds to, for example, image data that is output from a CCD image sensor or recorded. The lower parts of FIGS. 8 and 9 show image data in the PAL format after frame conversion. This image data corresponds to, for example, video signals output from a camera to an external television receiver or video signals supplied to a built-in LCD monitor. In the following description, only frame frequency conversion is described, and the description of horizontal frequency conversion is omitted.

In the case of FIG. 8, a first frame to a third frame in the NTSC format are respectively used for a first frame to a third frame in the PAL format. The odd field in a fourth frame in the NTSC format is used as the odd field 4A in a fourth frame in the PAL format, and the even field is decimated. A fifth frame in the NTSC format is used for the even field 4B in the fourth frame and the odd field 5A in a fifth frame in the PAL format.

After some fields in the NTSC format are decimated, residual fields in the NTSC format are converted into those in the PAL format so that the ratio of frame frequency of the NTSC format to that of the PAL format is eventually 1,200:1,001.

When every 1,200 frames of image data in the NTSC format are decimated to 1,001 frames, the sequence of the decimation is complicated because the location of the field to be decimated shifts as time elapses. Thus, when the decimation is carried out under the control of a central processing unit (CPU), there is a considerable software load.

Thus, the following technique shown in FIG. 9 has been conceived: Each frame of image data is retrieved from, for example, a CCD image sensor or a recording medium every ⅟30 seconds, and is converted into that in the PAL format. In this case, the ratio of frame frequency of the input image data to that of the PAL format is as follows:

30Hz:25Hz=6:5

Accordingly, as shown in FIG. 9, image data in the PAL format can be obtained by decimating one frame in the NTSC format every six frames, thereby enabling an easy frame conversion.

However, in this frame conversion technique, a discontinuous point occurs every five frames in the PAL format, which prevents smooth playback. Moreover, when a digital still camera captures moving images, the motion of the images is jerky as compared with that in a video camera, as described above. Hence, when frames of these moving images are converted with the technique shown in FIG. 9, the motion of the images is jerkier. Moreover, in some cases, an LCD monitor of a digital still camera cannot adapt to the 60 Hz synchronizing frequency system and cannot display images.

The present invention is intended to solve the above problems.

DISCLOSURE OF INVENTION

The present invention provides a method for converting frames including:

retrieving image data of an odd field and image data of an even field, out of moving image data of one first frame period, from a memory to which the moving image data is written, every odd field period and even field period in a second frame period, respectively;

mixing the retrieved image data of the odd field and image data of a next odd field that is retrieved next at a predetermined ratio to output as image data of an odd field in the second frame period;

mixing the retrieved image data of the even field and image data of a next even field that is retrieved next at a predetermined ratio to output as image data of an even field in the second frame period; and changing the mixing ratios for each field in the second frame period.

Thus, even when original image data is generated every first frame period, image data of fields in the second frame period is generated by interpolation. Accordingly, smooth moving images can be displayed based on this generated image data.

BRIEF DESCRIPTION OF THE DRAWINGS

FIGS. 6A and 6B illustrate the present invention.

FIG. 7 illustrates the present invention.

BEST MODE FOR CARRYING OUT THE INVENTION (1) Digital Still Camera

Figure 1:
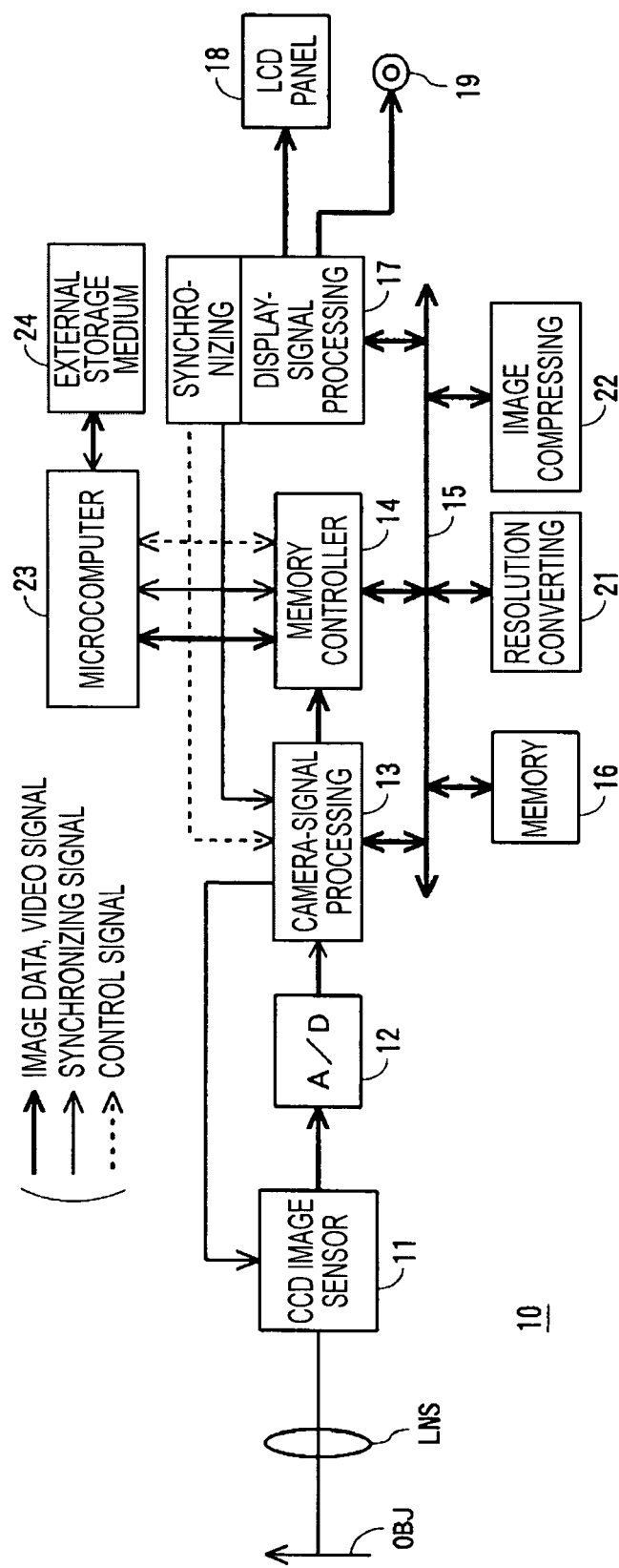
FIG. 1 is a block diagram illustrating an embodiment according to the present invention.

FIG. 1 illustrates a typical digital still camera 10 according to the present invention. An image of an object OBJ is projected onto a CCD image sensor 11 through an imaging lens LNS. Three-primary-color image signals of the object OBJ are output from the CCD image sensor 11. These image signals are supplied to an analog-to-digital (A/D) converter circuit 12 and are A/D-converted to digital image data. This image data is supplied to a camera-signal processing circuit 13, and is converted to image data in the Y-signal, U-signal, and V-signal (YUV) format after processes, for example, white balance correction and gamma correction. The converted image data is written to an area for display in a memory 16 by a memory controller 14 through an image bus 15.

In parallel with this process, the image data is read from the area for display in the memory 16 by the memory controller 14. The read image data is supplied to a display-signal processing circuit 17 through the image bus 15, and is converted to image data in the red, green, and blue (RGB) format while being D/A-converted to analog image signals. These analog image signals are supplied to an LCD panel 18 and are displayed as color images.

In the display-signal processing circuit 17, color video signals in addition to the analog image signals are simultaneously generated. These video signals are output to an external video output terminal 19 to be supplied to a monitoring television receiver (not shown in the drawing). In this process, the resolution of the image data, which is read from the memory 16 and used for display, is converted to, for example, the VGA size by a resolution-converting circuit 21.

The image data in the area for display in the memory 16 is also supplied to an image-compressing circuit 22 by the memory controller 14 through the image bus 15 and is compressed into code data in a predetermined format, for example, the Joint Photographic Experts Group (JPEG) format. This code data is written to a work area in the memory 16 through the image bus 15. The code data written to the work area in the memory 16 is read by the memory controller 14. This read code data is written to and stored in an external storage medium 24, such as a Memory Stick (trademark registered), by a microcomputer 23.

In a playback mode, the code data is read from the external storage medium 24 by the microcomputer 23 and is written to the work area in the memory 16. This written code data is decompressed into the original image data by the image-compressing circuit 22. This decompressed image data is written to the area for display in the memory 16. This written image data is processed by the display-signal processing circuit 17 to be displayed on the LCD panel 18 as color images and to be output to the external video output terminal 19 as color video signals, as described above.

To smooth the motion of moving images displayed on the LCD panel 18 and moving images of color video signals output to the external video output terminal 19 when these moving images are captured and played back, the following signal processing is carried out in the present invention.

(2) Capturing and Playing Back Moving Images

Figure 2:
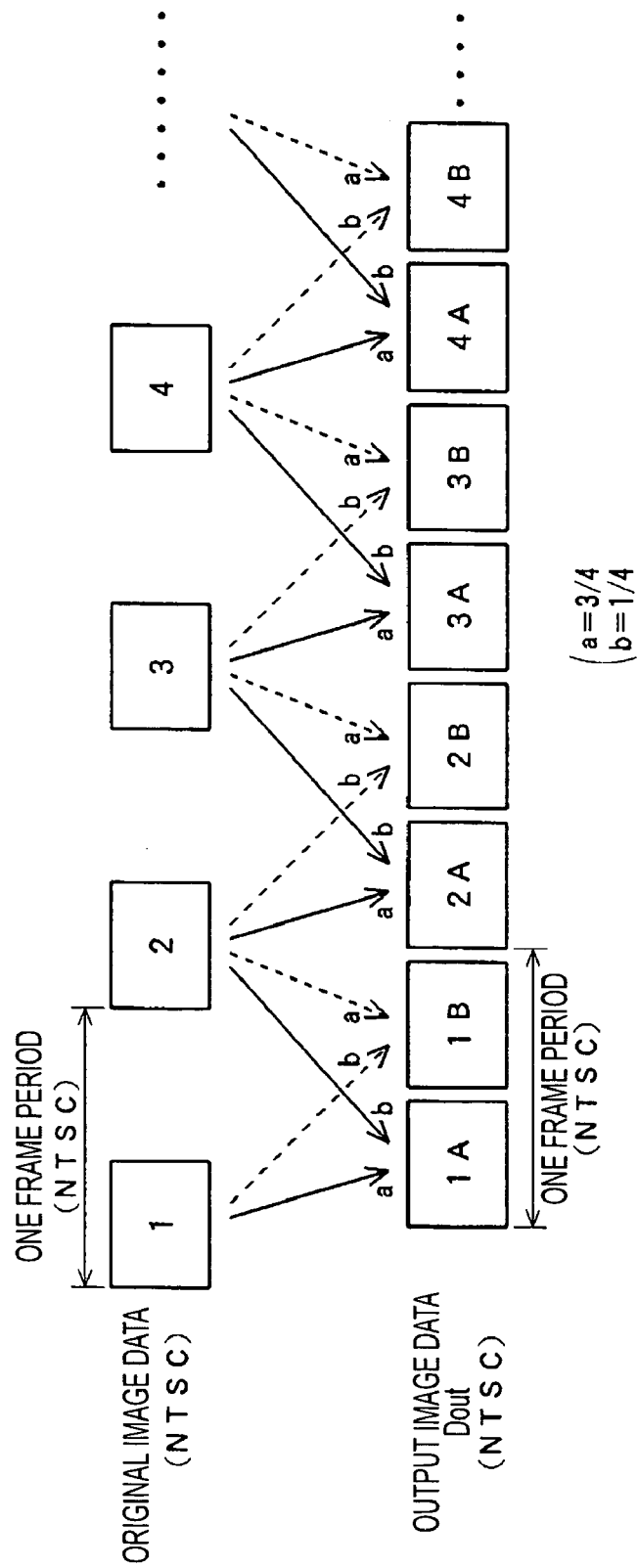
FIG. 2 illustrates the present invention.

As shown in the upper part of FIG. 2, when moving images are captured, the CCD image sensor 11 is controlled so as to capture an image in the NTSC format and to output image data once every frame period. Thus, as shown in FIGS. 6A and 6B, capturing still images can be optimally performed in units of frames as a primary function of a digital still camera.

Moreover, since image capturing is performed in units of frames of the NTSC format in this way, moving images stored in the external storage medium 24 and moving images read out are also in the NTSC format in units of frames.

(3) Method for Converting Frames (3-1) Outputting Video Signals in the NTSC Format In the following description, image data before frame conversion, such as the output of the CCD image sensor 11, is called original image data, and image data and video signals after frame conversion, such as video signals output from a camera, are respectively called output image data and output video signals.

As shown in the upper part of FIG. 2, original image data is obtained in units of frames of the NTSC format. In this case, the original image data is output in the form of video signals in the NTSC format. Thus, the frame frequency of the output video signals is the same as that of the original image data.

Accordingly, the output image data DOUT is a signal component represented by the following expression, as shown in FIG. 2:

$$DOUT=(1-k)D_n+k \cdot D_{n+1} \quad (1)$$

where

DOUT is output image data and output video signals after frame conversion, $D_n$ is image data of the odd field or the even field in the n-th frame in the original image data, $D_{n+1}$ is image data of the odd field or the even field in the (n+1)-th frame in the original image data, and k is a predetermined coefficient ($0 \leq k \leq 1$).

When the output image data DOUT is that of the odd field, the original image data $D_n$ and $D_{n+1}$ are image data of the odd fields. When the output image data DOUT is that of the even field, the original image data $D_n$ and $D_{n+1}$ are image data of the even fields. According to the field of the output image data DOUT, the coefficient k is changed, for example, as follows:

k=¼ when the output image data DOUT is that of the odd field, or k=¾ when the output image data DOUT is that of the even field.

That is, two continuous frames of the original image data are mixed for each field at a predetermined ratio that changes every field period to generate the output video signals (the output image data).

In this way, even when the original image data is generated every frame period, intermediate image data is generated by interpolation every field period. Displaying based on this generated image data improves the jerkiness when moving images are captured.

(3-2) Outputting Video Signals in the PAL Format

Figure 3:
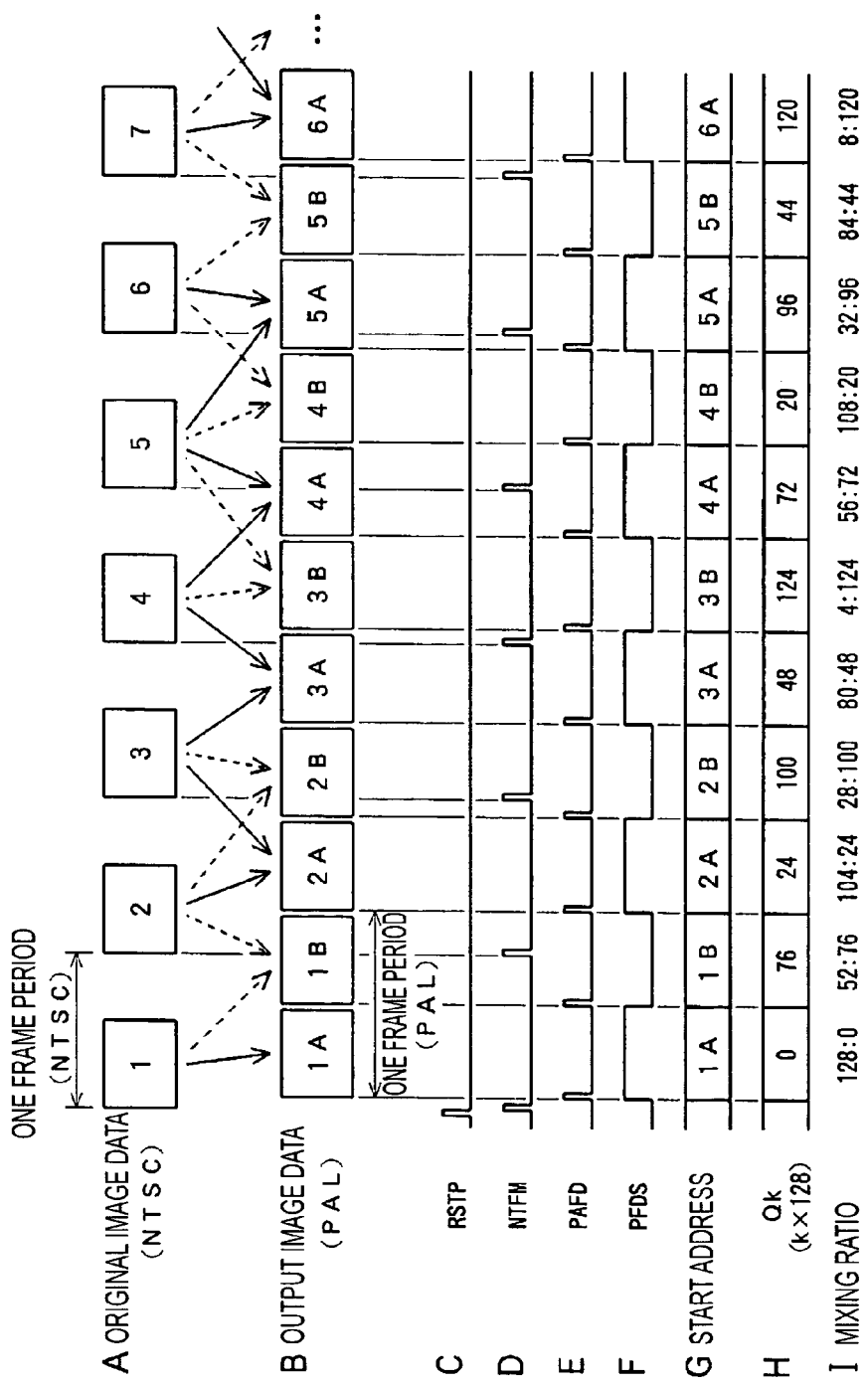
FIG. 3 illustrates the present invention.

The original image data is obtained as shown in part A of FIG. 3 (part A of FIG. 3 is the same as the upper part of FIG. 2). When this original image data is output as video signals in the PAL format, this original image data is output after a conversion process, as shown in part B of FIG. 3.

That is, in this process, the output image data DOUT is generated according to expression (1). In this process, the coefficient k changes by a predetermined amount every field period of the output image data DOUT according to the shift between frames of the original image data $D_n$ and $D_{n+1}$ and those of the output image data DOUT. Thus, two continuous frames of the original image data are mixed for each field at a predetermined ratio that changes every field period according to the shift between frames of the original image data $D_n$ and $D_{n+1}$ and those of the output image data DOUT to obtain the output video signals.

In FIG. 3, the even field (indicated by a dotted arrow) in the sixth frame of the original image data is used as the even field 4B in the fourth frame of the output image data, and the odd field (indicated by a solid arrow) in the fifth frame of the original image data is used as the odd field 5A in the fifth frame of the output image data. Thus, it seems that the chronological order of the even field 4B in the fourth frame and the odd field 5A in the fifth frame of the output image data is reversed. However, no problem occurs because of the following reason.

The same original image data is used in the even field 4B in the fourth frame and the odd field 5A in the fifth frame of the output image data, and the odd field and the even field in the original image data include signals generated at the same time. Moreover, the ratio of the fifth frame to the sixth frame of the original image data used in the even field 4B in the fourth frame of the output image data is different from that used in the odd field 5A in the fifth frame. In the even field 4B in the fourth frame of the output image data, the proportion of the fifth frame of the original image data is large, and in the odd field 5A in the fifth frame of the output image data, the proportion of the sixth frame of the original image data is large. Accordingly, the chronological order of the even field 4B in the fourth frame and the odd field 5A in the fifth frame of the output image data is not reversed.

Thus, in the process shown in part B of FIG. 3, even when the original image data is generated every frame period of the NTSC format, image data of each field in the PAL format is generated by interpolation and is displayed. Accordingly, the jerkiness when moving images are captured is improved.

(4) Circuit for Generating Output Image Data from Original Image Data

Figure 4:
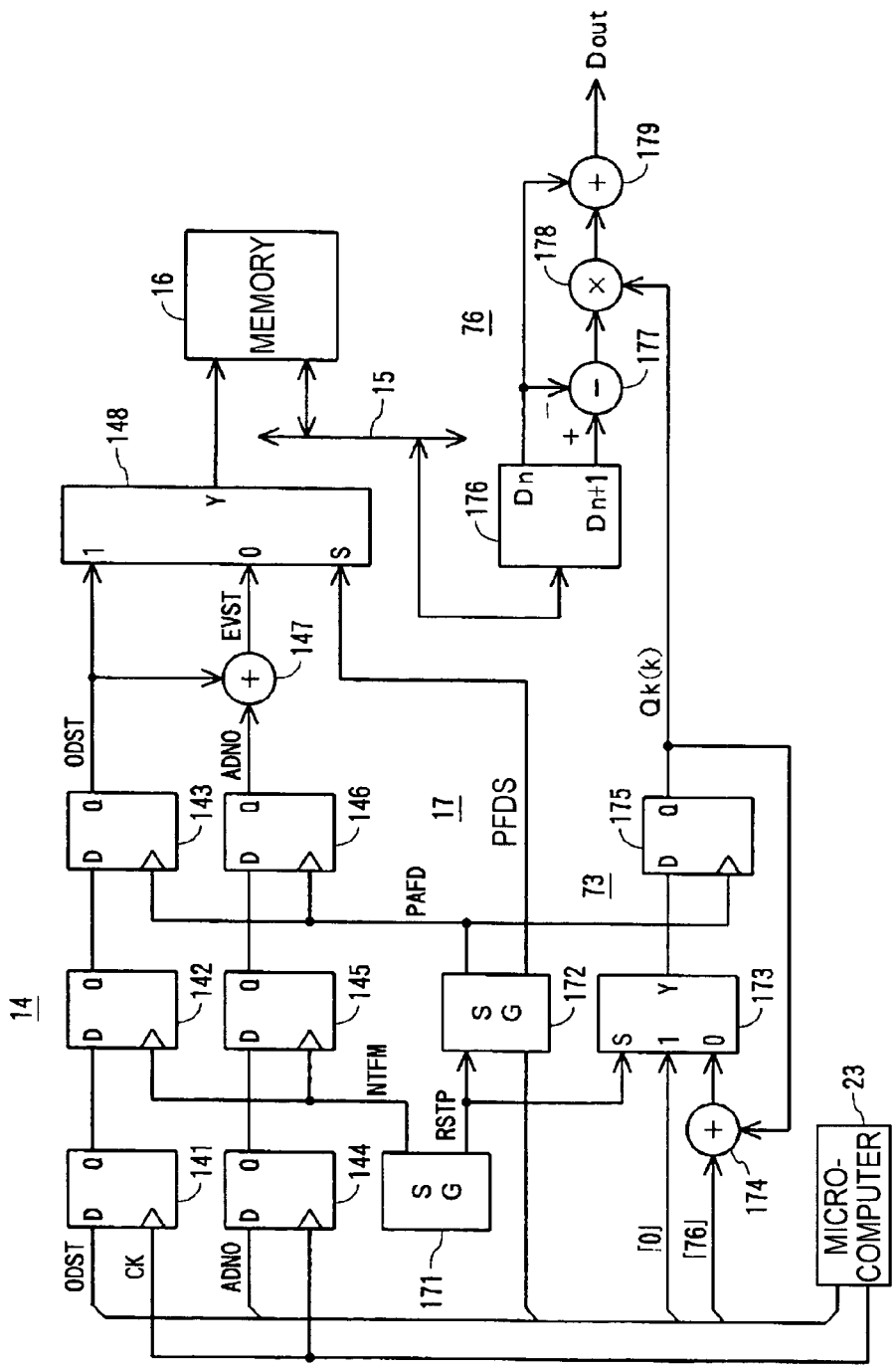
FIG. 4 is a block diagram illustrating a part of the present invention.

Frames of the original image data are converted to those of the output image data (the output video signals) mainly by, for example, the memory controller 14 and the display-signal processing circuit 17, as shown in FIG. 4. In the main, the case of the output image data in the PAL format will now be described. The original image data is written to the memory 16 in a bit map corresponding to a display screen. The original image data is then read from addresses corresponding to respective horizontal scanning positions.

As shown in FIG. 7, the total length of 1,200 frame periods of the NTSC format is the same as that of 1,001 frame periods of the PAL format. The NTSC frame is synchronized with the PAL frame once every total length.

The display-signal processing circuit 17 includes signal-generating circuits 171 and 172 that generate various types of timing signals. The signal-generating circuit 171 outputs a pulse NTFM every NTSC frame period, as shown in part D of FIG. 3, as well as a pulse RSTP every 1,200 NTSC frames, as shown in part C of FIG. 3.

The signal-generating circuit 172 outputs a pulse PAFD and a rectangular-wave signal PFDS every NTSC field period, or every PAL field period, as shown in part E and part F of FIG. 3. The microcomputer 23 supplies predetermined control signals to the signal-generating circuit 172 to set the period of the pulse PAFD and the period of the signal PFDS to the NTSC field period or the PAL field period. The signal-generating circuit 171 supplies the pulse RSTP to the signal-generating circuit 172.

Since the original image data is read from addresses of the memory 16, corresponding to respective horizontal scanning positions, the memory controller 14 includes a group of registers (latch circuits) 141 to 143, a group of registers (latch circuits) 144 to 146, an adding circuit 147, and a data selector 148. The registers 141 to 143 set an odd-field start address ODST (the start address of the first odd line) in an address counter (not shown in the drawing) in the memory 16, and the registers 144 to 146 store data ADNO indicating the number of addresses (the number of pixels) per line.

The memory 16 includes the address counter, which is not shown in the drawing. When a start address is supplied, a readout address is incremented every odd line or even line, starting from the start address, and image data of an odd field or an even field is sequentially read out.

When the microcomputer 23 supplies the odd-field start address ODST and a clock CK to the register 141, which stores the start address ODST. An output from the register 141 and the pulse NTFM from the signal-generating circuit 171 are supplied to the register 142, which stores the odd-field start address ODST. An output from the register 142 and the pulse PAFD from the signal-generating circuit 172 are supplied to the register 143, which outputs the odd-field start address ODST every pulse PAFD.

Similarly, the microcomputer 23 supplies the data ADNO indicating the number of addresses per line to the register 144, and the data ADNO is output from the register 146.

The adding circuit 147 adds the odd-field start address ODST from the register 143 to the data ADNO, indicating the number of addresses per line, from the register 146. Thus, the adding circuit 147 outputs an even-field start address EVST (the start address of the first even line).

The odd-field start address ODST, the even-field start address EVST, and the signal PFDS serving as a control signal from the signal-generating circuit 172 are supplied to the data selector 148 (in this case, the signal PFDS inverts every PAL field period). Thus, as shown in part G of FIG. 3, the data selector 148 alternately outputs the odd-field start address ODST and the even-field start address EVST every PAL field period.

These start addresses output from the data selector 148 are supplied to the memory 16. Thus, the original image data is retrieved from the memory 16 every PAL field period.

The retrieved original image data is supplied to an interpolating circuit 76 provided in the display-signal processing circuit 17. The interpolating circuit 76 converts the original image data in the memory 16 to the output image data by interpolation according to expression (1), and includes a converting circuit 176 and arithmetic circuits (a subtracting circuit 177, a multiplying circuit 178, and an adding circuit 179). The converting circuit 176 synchronously outputs image data $D_n$ of the odd field or the even field in the n-th frame and image data $D_{n+1}$ of the odd field or the even field in the (n+1)-th frame, out of the original image data read from the memory 16.

The image data $D_n$ and $D_{n+1}$ output from the converting circuit 176 are supplied to the subtracting circuit 177, which subtracts the data $D_n$ from the data $D_{n+1}$ and supplies the result ($D_{n+1}-D_n$) to the multiplying circuit 178. The coefficient k is also supplied to the multiplying circuit 178 from a coefficient-generating circuit 73, described below, to be multiplied by the value ($D_{n+1}-D_n$) The result $k(D_{n+1}-D_n)$ and the data $D_n$ from the converting circuit 176 are supplied to the adding circuit 179.

The adding circuit 179 outputs the image data DOUT represented by the following expression:

$$k(D_{n+1} - D_n) + D_n = (1 - k)D_n + k \cdot D_{n+1} \quad (2)$$
$$= DOUT$$

This image data DOUT is D/A-converted to analog color video signals to be output to the external video output terminal 19. Thus, images in the PAL format are displayed on a monitoring television receiver connected to the external video output terminal 19.

In this case, to smooth the motion of these displayed images, the display-signal processing circuit 17 includes the coefficient-generating circuit 73. The coefficient-generating circuit 73 generates the coefficient k, which changes according to the shift between the NTSC frame and the PAL frame, as described above.

In this case, when the output image data in the PAL format is generated from the original image data, the time resolution of the output image data is 1/128 of the field period of the PAL format.

The coefficient-generating circuit 73 accumulates a predetermined delta value every PAL field period to generate the coefficient k, and includes a data selector 173 that changes the initial value and the delta value, an adding circuit 174 for accumulation, and a 7-bit register (a latch circuit) 175 that stores the accumulated value. The microcomputer 23 outputs, for example, "0" and "76" as the initial value and the delta value, respectively, to the data selector 173 and the adding circuit 174. The signal-generating circuit 171 outputs the pulse RSTP to the data selector 173 as a control signal.

When RSTP=1, the initial value "0" is output from the data selector 173 and the register 175 stores the output initial value "0" upon receiving the pulse PAFD from the signal-generating circuit 172. Thus, as shown in part H of FIG. 3, an output Qk from the register 175 is "0" for one field period (one PAL field period) after the pulse RSTP is sent. Simultaneously, the output Qk (=0) from the register 175 and the delta value "76" from the microcomputer 23 are summed up in the adding circuit 174, and the summed-up value "76" is output from the adding circuit 174.

Subsequently, the value of RSTP is "0". When one field period (the period of the field 1A) has elapsed since the value of RSTP is "0", RSTP="0". Thus, the current value "76" of the output from the adding circuit 174 is supplied to the register 175 through the data selector 173, and the register 175 stores the value "76" upon receiving the pulse PFDS. As shown in part H of FIG. 3, Qk=76 from this point of time. Accordingly, the output from the adding circuit 174 is "152".

When a further field period of the PAL format has elapsed, the output "152" from the adding circuit 174 is supplied to the register 175 through the data selector 173 and the register 175 stores the value "152" upon receiving the pulse PFDS. However, since the register 175 is a 7-bit register, only the lower 7 bits of the output "152" from the adding circuit 174 are latched into the register 175. As shown in part H of FIG. 3, the output Qk from the register 175 is "24" (=152−128).

The above operation is repeated every field period of the PAL format, so that the output Qk from the register 175 changes every field period of the PAL format, as shown in part H of FIG. 3. This output Qk is shifted toward the least significant bit (LSB) by seven bits to be supplied to the multiplying circuit 178 as the coefficient k. That is, the value Qk/128 is supplied to the multiplying circuit 178 as the coefficient k. Multiplying both sides of expression (1) by 128 results in:

$$128 \times DOUT = 128 \times (1 - k)D_n + 128 \times k \times D_{n+1} \quad (3)$$
$$= (128 - Qk)D_n + Qk \cdot D_{n+1}$$

Thus, in FIG. 3, since Qk=0 (k=0) for the period of the odd field 1A in the first frame of the output image data, image data of the odd field 1A is generated by mixing the odd field in the first frame and the odd field in the second frame of the original image data in the ratio of 128:0, as shown in part I of FIG. 3. Since Qk=76 (k=76/128) for the period of the even field 1B in the first frame of the output image data, image data of the even field 1B is generated by mixing the even field in the first frame and the even field in the second frame of the original image data in the ratio of 52:76.

Furthermore, since Qk=24 (k=24/128) for the period of the odd field 2A in the second frame of the output image data, image data of the odd field 2A is generated by mixing the odd field in the second frame and the odd field in the third frame of the original image data in the ratio of 104:24. Since Qk=100 (k=100/128) for the period of the even field 2B in the second frame of the output image data, image data of the even field 2B is generated by mixing the even field in the second frame and the even field in the third frame of the original image data in the ratio of 28:100.

Continuously, image data of fields of two continuous frames of the original image data are mixed at a certain ratio shown in part I of FIG. 3 every field period of the PAL format to generate the output image data DOUT (the output video signals) in the same way.

Thus, even when the original image data is generated every frame period of the NTSC format, image data of each field in the PAL format is generated by interpolation. Since this generated image data is the output image data DOUT, the jerkiness when moving images are captured is improved to smooth the motion of the moving images.

On the other hand, when the output image data DOUT in the NTSC format is generated, the microcomputer 23 controls the signal-generating circuit 172 so as to set the period of the pulse PAFD and the period of the signal PFDS to the NTSC field period. The microcomputer 23 outputs, for example, "32" and "64" as the initial value and the delta value, respectively, to the data selector 173 and the adding circuit 174.

In this case, since the output Qk from the coefficient-generating circuit 73 alternately changes to "32" or "96" every field period of the NTSC format, the coefficient k, which is the mixing ratio in the interpolating circuit 76, alternately changes to ¼ or ¾ every field period of the NTSC format. Thus, the process is as shown in FIG. 2, so that smooth moving images can be displayed when the output image data DOUT in the NTSC format is generated.

(5) Another Type of Interpolating Circuit 76

Figure 5:
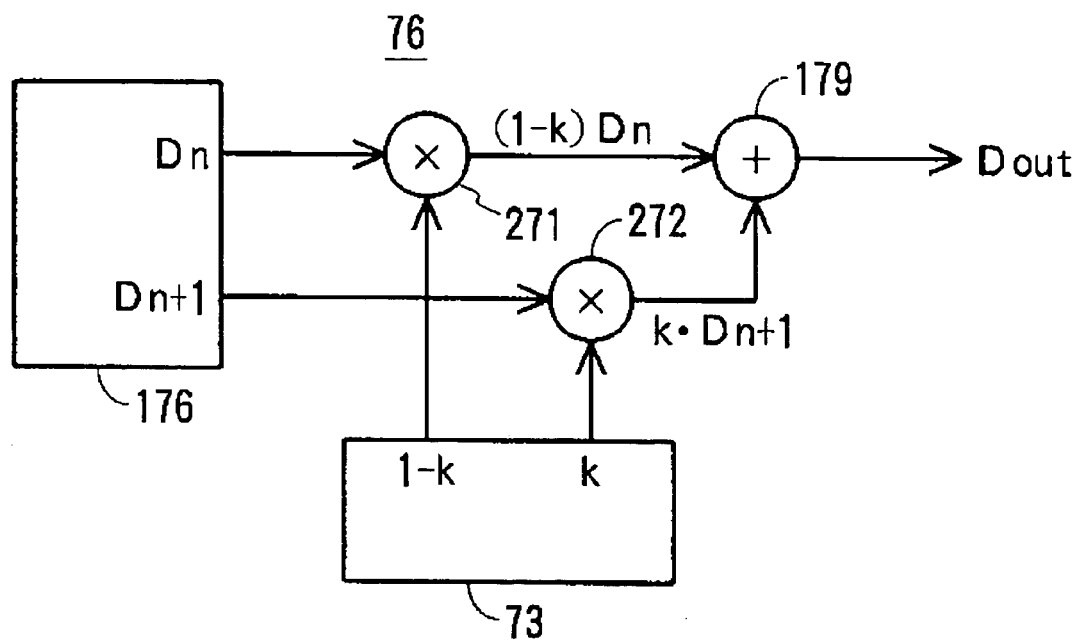
FIG. 5 illustrates the present invention.
Figure 8:
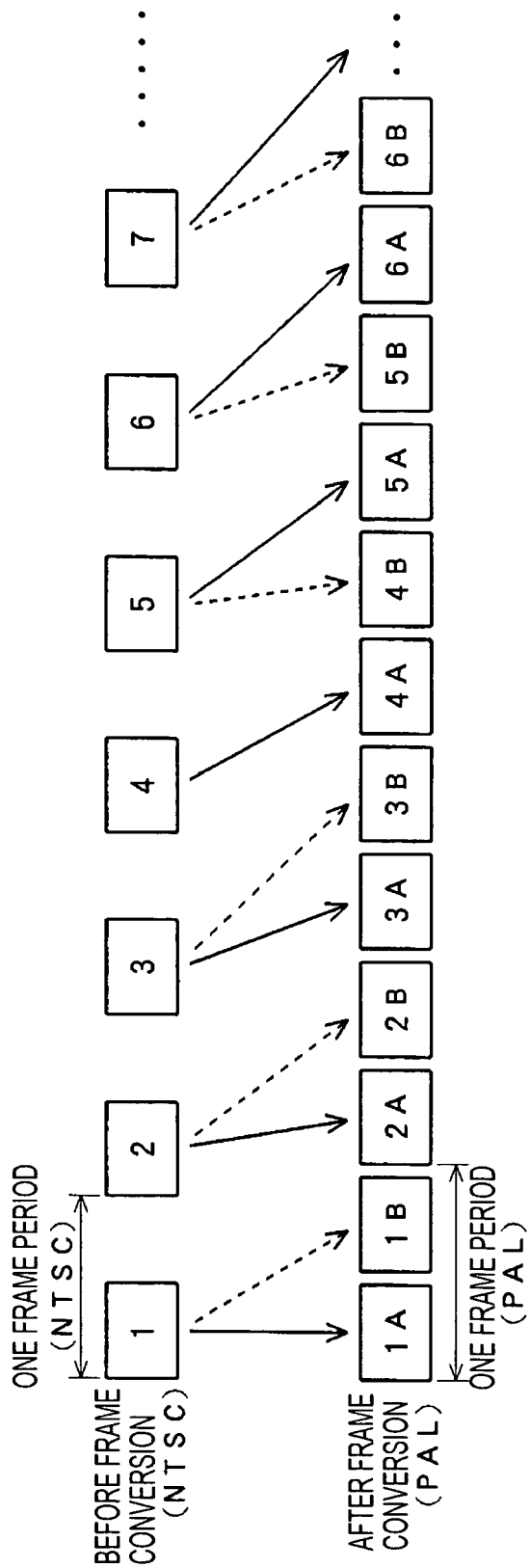
FIG. 8 illustrates the present invention.
Figure 9:
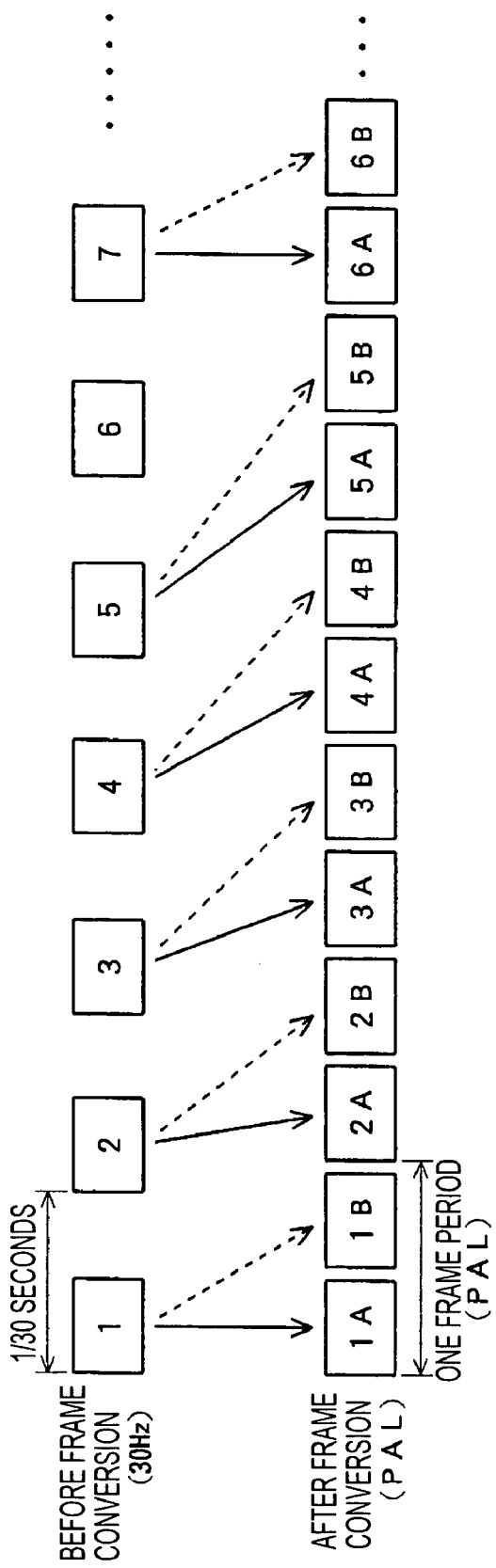
FIG. 9 illustrates the present invention.

FIG. 5 illustrates another type of the interpolating circuit 76. In this case, the image data $D_n$ and $D_{n+1}$ output from the converting circuit 176 and coefficients (1-k) and k output from the coefficient-generating circuit 73 are supplied to multiplying circuits 271 and 272. Then, the results of multiplication from the multiplying circuits 271 and 272 are supplied to the adding circuit 179, which outputs the image data DOUT represented by expression (1).

According to the present invention, even when the original image data is generated every frame period of the NTSC format, image data of fields in the PAL format is generated by interpolation to be used for display. Thus, smooth moving image can be displayed.

The invention claimed is:

1. A method for converting frames comprising:
   retrieving from a memory in which successive frames of moving image data are stored as input frames, an odd field of the stored image data and an even field of the stored image data, in each input frame period;
   mixing the retrieved image data of the odd field of a first frame of the input frame period and image data of the odd field of a successive frame of the input frame period retrieved next at a predetermined mixing ratio to output image data of an odd field in an output frame period;
   mixing the retrieved image data of the even field of a first frame of the input frame period and image data of the even field of the successive frame of the input frame period retrieved next at a predetermined mixing ratio to output image data of an even field in the output frame period; and
   changing the mixing ratios for each field in the output frame period.

2. The method for converting frames according to claim 1, wherein
   the input frame period is the frame period of the NTSC format; and
   the output frame period is the frame period of the PAL format.

3. The method for converting frames according to claim 1, wherein
   the input frame period is the frame period of the NTSC format; and
   the output frame period is switched to the frame period of the NTSC format or the frame period of the PAL format.

4. A frame-converting circuit comprising:
   a memory in which successive frames of moving image data, including an odd field and an even field in each input frame period are written;
   a first circuit for retrieving an odd field and an even field of the moving image data from the memory;
   a second circuit for mixing the retrieved image data of the odd field of a first frame of the input frame period and image data of the odd field of a successive frame of the input frame period retrieved next at a predetermined mixing ratio to output as image data of an odd field in an output frame period, and
   for mixing the retrieved image data of the even field of a first frame of the input frame period and image data of the even field of the successive frame of the input frame period retrieved next at a predetermined mixing ratio to output as image data of an even field in the output frame period; and
   a third circuit for changing the mixing ratios for each field in the output frame period.

5. The frame-converting circuit according to claim 4, wherein
   the input frame period is the frame period of the NTSC format; and
   the output frame period is the frame period of the PAL format.

6. The frame-converting circuit according to claim 4, further comprising:
   a fourth circuit for switching the output frame period to the frame period of the NTSC format or the frame period of the PAL format,
   wherein the input frame period is the frame period of the NTSC format.

7. An electronic camera comprising:
   an image sensor, onto which an image of an object is projected, for outputting successive frames of image data, including an odd field and an even field of one frame every first frame period;
   a memory to which the frames of image data are written;
   a first circuit for retrieving an odd field and an even field of the image data from the memory in a second frame period;
   a second circuit for mixing the retrieved image data of the odd field and the image data of the odd field of a successive frame retrieved next at a predetermined mixing ratio to output an odd field of image data in the second frame period, and
   for mixing the retrieved image data of the even field and the image data of the even field of a successive frame retrieved next at a predetermined mixing ratio to output an even field of image data in the second frame period;
   a third circuit for changing the mixing ratios for each field in the second frame period; and
   an external terminal outputting the image data output from the second circuit.

8. The electronic camera according to claim 7, further comprising:
   a fourth circuit for switching the second frame period to the frame period of the NTSC format or the frame period of the PAL format,
   wherein the first frame period is the frame period of the NTSC format.

* * * * *